(12) United States Patent
Mercier

(10) Patent No.: US 6,925,867 B2
(45) Date of Patent: Aug. 9, 2005

(54) FLUID METER, IN PARTICULAR WATER METER WITH VOLUMETRIC MEASUREMENT CHAMBER

(75) Inventor: Alcide Mercier, Nâcor (FR)

(73) Assignee: Actaris SAS (FR)

( * ) Notice: Subject to any disclaimer, the term of this patent is extended or adjusted under 35 U.S.C. 154(b) by 0 days.

(21) Appl. No.: 10/817,144

(22) Filed: Apr. 1, 2004

(65) Prior Publication Data

US 2004/0255668 A1 Dec. 23, 2004

(30) Foreign Application Priority Data

Apr. 4, 2003 (FR) .......................................... 03 50087

(51) Int. Cl.⁷ ............................................. G01F 15/14
(52) U.S. Cl. ...................................................... 73/273
(58) Field of Search .................... 73/273, 224; 222/335

(56) References Cited

U.S. PATENT DOCUMENTS

| | | | |
|---|---|---|---|
| 3,842,672 A | 10/1974 | Schneider, Jr. ............... 73/253 |
| 4,253,332 A | * 3/1981 | Sabatino et al. ............... 73/224 |
| 4,580,703 A | * 4/1986 | Anderson, Jr. ............... 222/335 |
| 5,706,372 A | * 1/1998 | Viduya ......................... 385/12 |

FOREIGN PATENT DOCUMENTS

| | | | |
|---|---|---|---|
| GB | 667721 | 3/1950 | |
| GB | 678483 | 8/1950 | ................. 106/110 |

\* cited by examiner

Primary Examiner—Edward Lefkowitz
Assistant Examiner—Jewel Thompson
(74) Attorney, Agent, or Firm—Sofer & Haroun, LLP

(57) ABSTRACT

A fluid meter, in particular a water meter, comprises a tank having a bottom and into which is inserted through an opening opposite the bottom in an insertion direction parallel to its axis of symmetry a measurement chamber having at least one lateral orifice connected in a sealed manner to a pipe of the tank via a seal that is compressed between an external surface of the chamber, called the first surface, and an internal surface of the tank, called the second surface. The first and second surfaces are inclined to the axis of symmetry of the tank and the minimum distance between the first and second surfaces and the axis of symmetry is near the bottom of the tank.

7 Claims, 3 Drawing Sheets

FIG_1
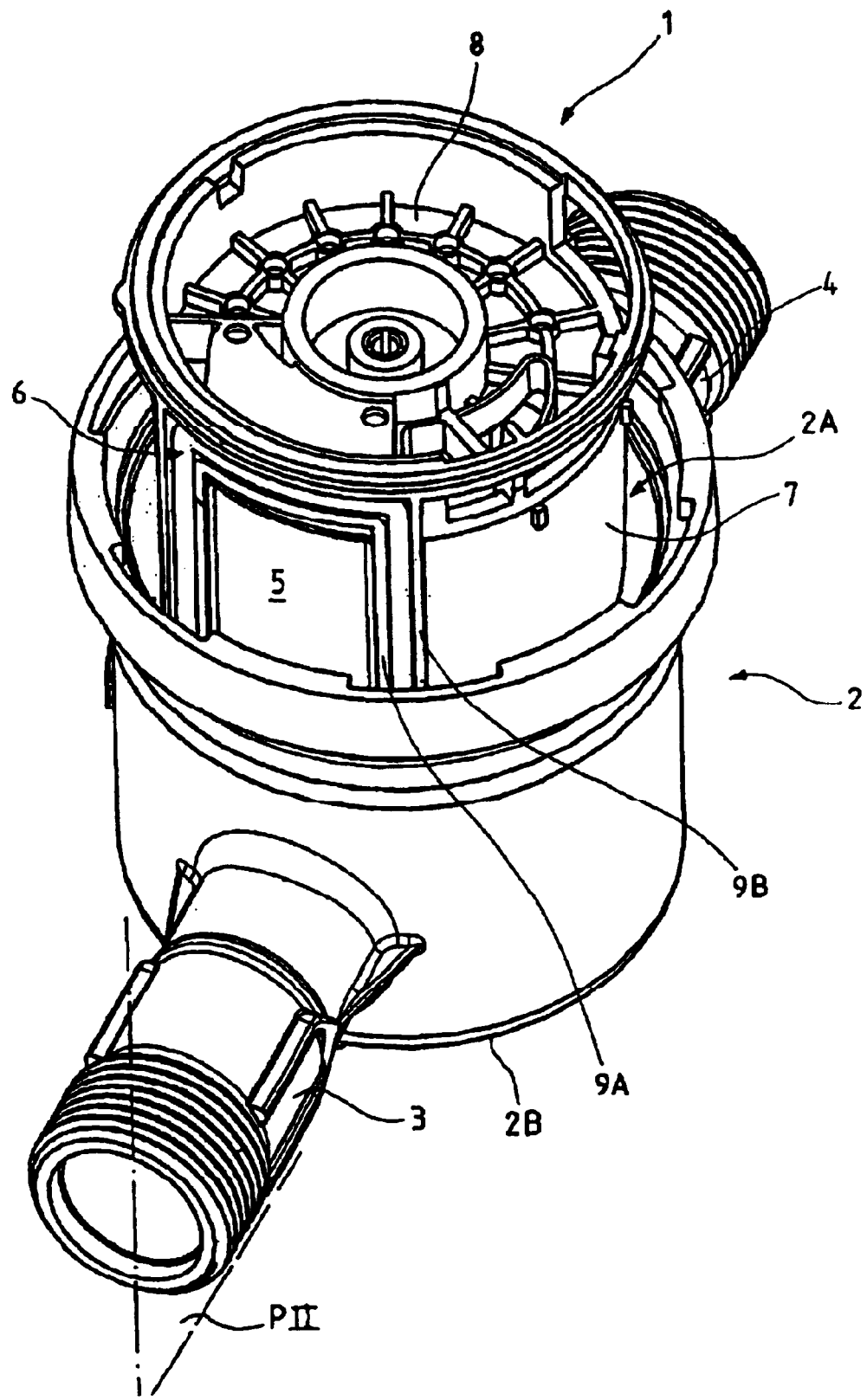

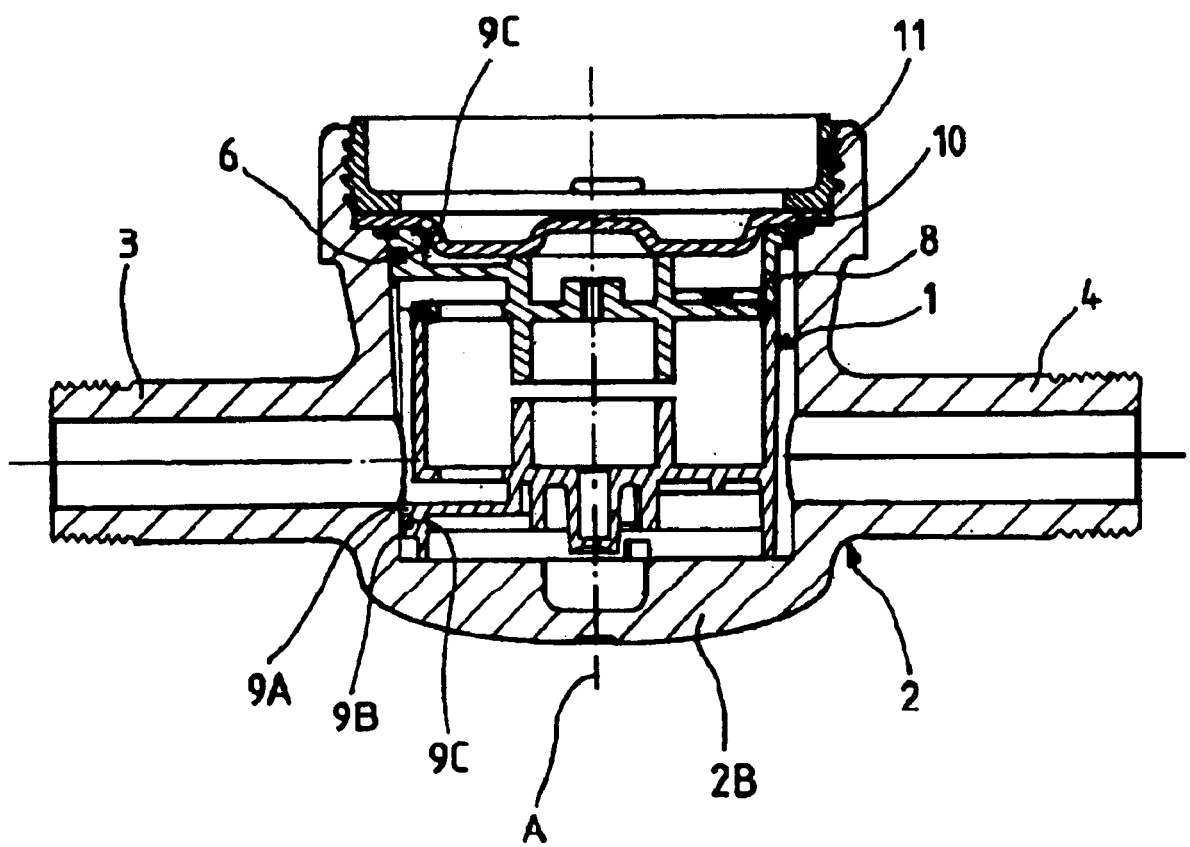
FIG_2

FIG_3
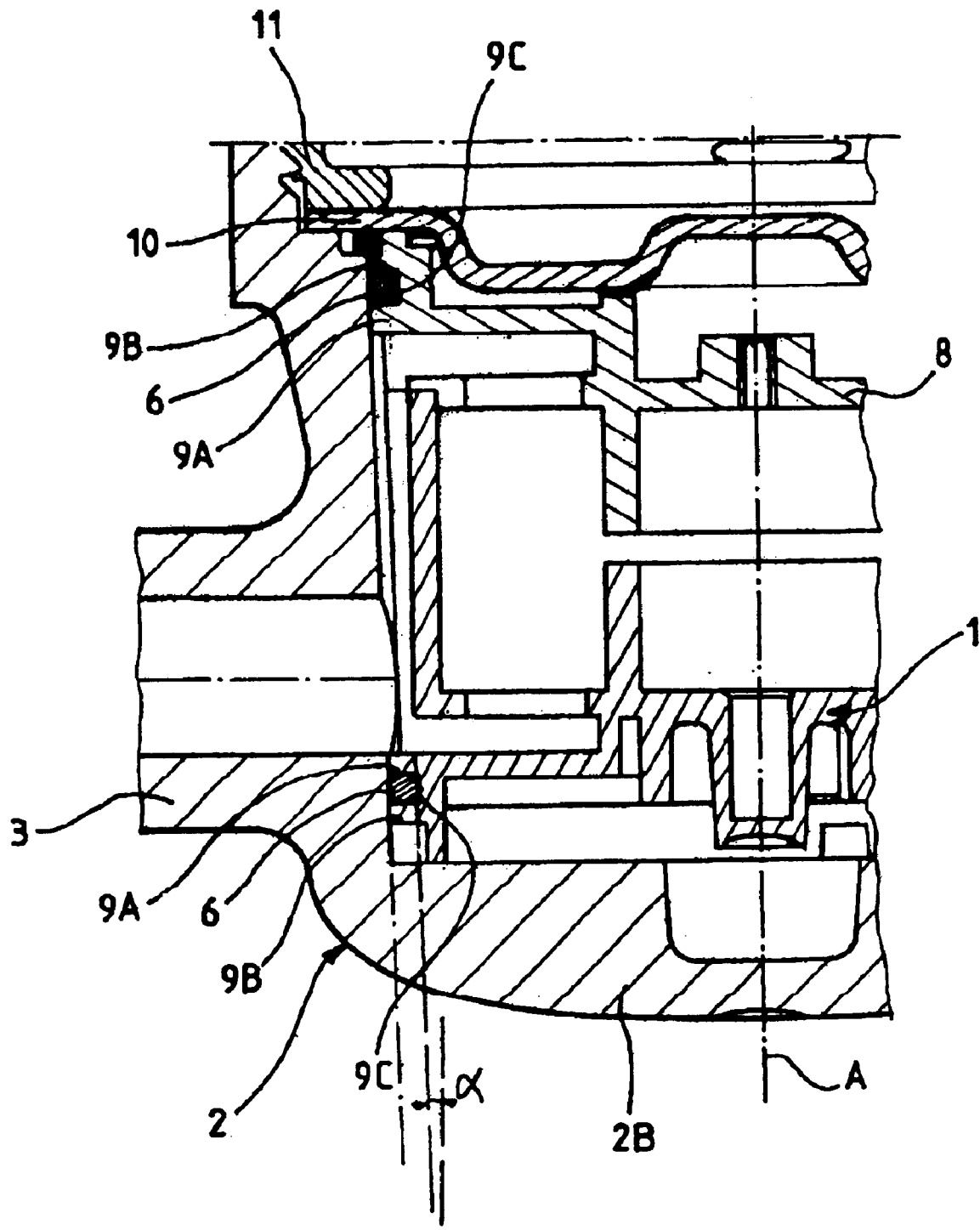

FLUID METER, IN PARTICULAR WATER METER WITH VOLUMETRIC MEASUREMENT CHAMBER

RELATED APPLICATION:

This application is related to and claims the benefit of priority from French Patent Application No. 03 50087, filed on Apr. 4 2003, the entirety of which is incorporated herein by reference.

BACKGROUND OF THE INVENTION

1. Field of the Invention

The present invention relates to a fluid meter, in particular a water meter with a volumetric measurement chamber.

2. Description of the Prior Art

A prior art meter of this kind comprises a casing or tank having an inlet pipe and an outlet pipe and into which is inserted an oscillating piston type volumetric measurement chamber. The measurement chamber has at least one inlet orifice and at least one outlet orifice. This kind of meter is well known to the person skilled in the art.

In some forms of measurement chamber, like that shown in FIG. 1, the inlet orifice or the outlet orifice 5 extends over a particular height on the lateral wall of the enclosure of the chamber 1. This orifice must be connected in a sealed manner to the corresponding inlet or outlet pipe 3, 4 and, to this end, a seal 6 is fitted into a groove around the orifice on the external face of the enclosure of the chamber. Once the measurement chamber 1 has been inserted into the tank 2, this seal 6 is compressed in the gap between the measurement chamber and the tank and provides a sealed passage for the fluid between the corresponding pipe and the orifice.

The measurement chamber 1 has a cylindrical external surface of generally constant circular section, except at the place where the seal is secured, and likewise the internal surface of the tank 2. This is known in the art. The shape of the seal 6 corresponds to that of the orifice, which is generally rectangular.

Assembly is effected by fitting the seal into its groove in the measurement chamber 1 and then inserting the measurement chamber into the tank 2.

To provide a seal, the unstressed seal has a diameter greater than the width of the gap between the measurement chamber and the tank. Thus when the measurement chamber, which has a constant generally circular section, is inserted, the seal is subjected to forces in the direction opposite to that in which the measurement chamber is inserted into the tank, which is also of constant circular section, and this applies over the whole of the assembly height. These relatively high forces may expel the seal from the groove, detaching the seal from the measurement chamber, with the risk of deforming the seal in a direction opposite to the insertion direction, and even cutting the seal, the measurement chamber being assembled to the tank with no seal, making the meter useless. These problems are incompatible with mass production assembly of the meter.

SUMMARY OF THE INVENTION

The invention solves these problems and, to this end, proposes a fluid meter, in particular a water meter, comprising a tank having a bottom and into which is inserted through an opening opposite the bottom in an insertion direction parallel to its axis of symmetry a measurement chamber having at least one lateral orifice connected in a sealed manner to a pipe of the tank via a seal that is compressed between an external surface of the chamber, called the first surface, and an internal surface of the tank, called the second surface, wherein the first and second surfaces are inclined to the axis of symmetry of the tank and the minimum distance between the first and second surfaces and the axis of symmetry is near the bottom of the tank.

In a preferred embodiment, the distance between the first and second surfaces and the axis of symmetry is inversely proportional to the distance between the surfaces and the upper opening.

The first and second surfaces are preferably substantially parallel and the seal is preferably of constant section.

The seal may have a circular or non-circular section, for example a lip section in the latter case.

The seal is advantageously housed in a groove formed on the measurement chamber and the bottom of which constitutes the first surface.

In this case, the groove is delimited by two ribs the end faces of which are parallel to the groove bottom.

The whole of the internal surface of the tank is advantageously frustoconical.

The invention is particularly well suited to plastic material tanks. This is because plastic material tanks have a frustoconical internal shape because they are molded and their removal from the mold necessitates a relief.

Thanks to the invention, assembly becomes compatible with the quality and productivity constraints of mass production assembly, with no operations additional to insertion of the measurement chamber into the tank nesting fashion.

The invention is described in more detail hereinafter with the aid of figures that show a preferred embodiment of the invention.

BRIEF DESCRIPTION OF THE DRAWINGS

FIG. 1 is a view of a meter during assembly.

FIGS. 2 and 3 are views in section in the plane PII in FIG. 1 of a meter according to the invention, FIG. 3 being a partial view.

DETAILED DESCRIPTION OF THE PREFERRED EMBODIMENT

As shown in FIG. 1, a fluid meter, here a water meter, includes an oscillating piston type volumetric measurement chamber 1 inserted in an insertion direction into a tank 2 having an inlet pipe 4 and an outlet pipe 3. To be more precise, the chamber is inserted via an opening 2A opposite the bottom 2B of the tank. The insertion direction is parallel to the axis A of symmetry of the tank 2.

The external enclosure 7 and the lid 8 of the measurement chamber form an orifice 5 on the lateral wall of the chamber 1 that extends over a particular height and is adapted to be connected in sealed manner to the outlet pipe 3; to this end, a circular section seal 6 that is radially elastic and of generally rectangular shape, like the orifice, is fitted into a groove formed on the external face of the enclosure 7 of the chamber around the orifice 5.

The groove is formed by two ribs 9A, 9B molded onto the exterior enclosure 7 and the lid 8 of the measurement chamber around the orifice 5.

The same reference numbers are used in FIGS. 2 and 3 for components analogous to those in FIG. 1. Moreover, the volumetric measurement chamber 1 is represented in these figures without the piston, and its internal construction is not described, being well known in the art. As is also well known in the art, a plate 10 is disposed above the chamber with an exterior seal between it and the chamber and the tank. This seal is compressed by a threaded ring 11 that immobilizes the nested components.

The seal 6 is therefore compressed between an external surface of the chamber, called the first surface, consisting of the bottom 9C of the groove, and an internal surface of the tank, called the second surface, consisting of the internal surface of the tank near the pipe 3. To facilitate fabrication of the tank 2, the whole of its internal surface is frustoconical. According to the invention, these surfaces are inclined to the axis A of symmetry of the tank, the minimum distance between these surfaces and the axis A of symmetry being that near the bottom 2B of the tank 2.

To be more precise, in the embodiment described, the distance of the first and second surfaces from the axis A of symmetry is inversely proportional to the distance between those surfaces and the upper opening 2A of the tank 2 through which the measurement chamber 1 is inserted. These first and second surfaces are substantially parallel, the seal 6 being of constant circular section.

Moreover, to center the chamber 1 in the tank 2, the two ribs 9A, 9B have their end face parallel to the groove bottom 9C.

The assembly of the various components begins with nesting the seal 6 in the groove. The measurement chamber 1 fitted with the seal 6 is then inserted into the tank 2 in an insertion direction parallel to its axis of symmetry. Because of the identical cone angles α of the groove bottom 9C and the internal surface of the tank 2, contact of the seal 6 with this internal surface and its compression as required to provide the seal occurs only in the final assembly position, when the chamber is installed at the bottom of the tank. The end face of the two ribs 9A, 9B is then abutted against the internal surface of the tank to retain and center the measurement chamber 1 therein.

There is described above an outlet orifice 5 that has to communicate with the outlet pipe 3 of the tank, but the invention applies equally well of course to the situation of an inlet orifice of the same type that has to communicate with the inlet pipe 4 of the tank.

Moreover, in the embodiment described, the seal is mounted in a groove carried by the measurement chamber, but in accordance with the same principle the groove could be carried by the tank.

The foregoing description envisages first and second surfaces that are substantially parallel, the seal 6 being of constant circular section. In another embodiment conforming to the invention, these first and second surfaces need not be parallel and the seal may be designed to take up the varying clearance between these surfaces. In this case it may have a circular or non-circular section. This embodiment has the advantage of limiting friction and preventing jamming on insertion of the measurement chamber into the tank.

There is claimed:

1. A fluid meter, in particular a water meter, said water meter comprising:
   a tank having a bottom and into which is inserted through an opening opposite said bottom in an insertion direction parallel to its axis of symmetry a measurement chamber having at least one lateral orifice connected in a sealed manner to a pipe of said tank via a seal that is compressed between an external surface of said chamber, called the first surface, and an internal surface of said tank, called the second surface, wherein said first and second surfaces are inclined to said axis of symmetry of said tank and the minimum distance between said first and second surfaces and said axis of symmetry is near said bottom of said tank.

2. The meter claimed in claim 1, wherein the distance between said first and second surfaces and said axis of symmetry is inversely proportional to the distance between said surfaces and said upper opening.

3. The meter claimed in claim 1, wherein said first and second surfaces are substantially parallel and said seal is of constant section.

4. The meter claimed in claim 1, wherein said seal is housed in a groove formed on said measurement chamber and the bottom of which constitutes said first surface.

5. The meter claimed in claim 4, wherein said groove is delimited by two ribs the end faces of which are parallel to said groove bottom.

6. The meter claimed in claim 1, wherein the whole of the internal surface of said tank is frustoconical.

7. The meter claimed claim 1, wherein the tank is made of a plastic material.

* * * * *